United States Patent [19]

Herrmann

[11] Patent Number: 5,995,756
[45] Date of Patent: Nov. 30, 1999

[54] SYSTEM FOR INTERNET-BASED DELIVERY OF COMPUTER APPLICATIONS

[75] Inventor: Conrad Herrmann, Soquel, Calif.

[73] Assignee: Inprise Corporation, Scotts Valley, Calif.

[21] Appl. No.: 08/799,951

[22] Filed: Feb. 14, 1997

[51] Int. Cl.⁶ .................................................. G06F 9/44
[52] U.S. Cl. ..................... 395/712; 709/216; 709/221; 707/513
[58] Field of Search ..................................... 395/701, 712, 395/702, 703; 709/203, 216, 217, 218, 219, 220, 221, 222, 223; 707/500, 501, 513, 526

[56] References Cited

U.S. PATENT DOCUMENTS

| | | | |
|---|---|---|---|
| 5,487,141 | 1/1996 | Cain et al. | 395/135 |
| 5,608,898 | 3/1997 | Turpin et al. | 395/619 |
| 5,640,501 | 6/1997 | Turpin | 395/768 |
| 5,651,108 | 7/1997 | Cain et al. | 395/340 |
| 5,704,029 | 12/1997 | Wright, Jr. | 395/149 |
| 5,708,780 | 1/1998 | Levergood et al. | 395/200.12 |
| 5,721,908 | 2/1998 | Lagarde et al. | 395/610 |
| 5,742,836 | 4/1998 | Turpin et al. | 395/768 |
| 5,745,712 | 4/1998 | Turpin et al. | 395/333 |
| 5,745,754 | 4/1998 | Lagarde et al. | 395/615 |

OTHER PUBLICATIONS

Pacheco et al., "Delphi Developer's Guide," Sams Publishing, ISBN 0–672–30704–9, 1995.
Chappell, "Understanding ActiveX and OLE," Microsoft Press, Redmond, WA, Oct. 1996.
Brown et al., "Special Edition Using Netscape 2," Que Corp., ISBN 0–7897–0612–1, 1995.

*Primary Examiner*—Tariq R. Hafiz
*Assistant Examiner*—Kakali Chaki
*Attorney, Agent, or Firm*—John A. Smart

[57] ABSTRACT

A development system is described which provides a form-based development environment for partitioning an application such that it can be seamlessly integrated into corporate Webs (i.e., "intranets"). A form is implemented as an "application page" and published as an ActiveX object. Specifically, a new "application" page MIME type is defined: application/x-appdoc. This contains information necessary to create a document (e.g., Microsoft ActiveX Document) locally but, in addition, also includes information necessary to find and download the program code for rendering the view of the document. If the program code is already present locally, it need only be downloaded for purpose of updating the local copy. Once a form is built into an ActiveX object and digitally signed, it can be downloaded to a client and run in a Web browser, such as Microsoft Internet Explorer.

10 Claims, 8 Drawing Sheets

SYSTEM FOR INTERNET-BASED DELIVERY OF COMPUTER APPLICATIONS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

With the explosive growth of the Internet and the World Wide Web, an ever-increasing number of computers of disparate platforms are being connected together. Often, companies employ an Internet-based network operating within the company or world wide, for assisting with its data processing needs. In such an environment, clients (i.e., end-user's work stations) typically operate Web browser software (e.g., Microsoft Internet Explorer or Netscape Navigator) connected to a Web server, often operating in conjunction with a back-end data server. A Web browser communicates with Web servers using Hypertext Transfer Protocol (HTTP), a simple request/response protocol for information transfer using TCP/IP. The Web server receives a request, retrieves the requested object (e.g., file), sends it to the browser, and then drops the connection.

In typical operation, end-users operate various client applications at the client machines which, in turn, connect to the servers for obtaining corporate data—a form of distributed computing. Such an arrangement is problematic, however. One problem, for instance, is tracking the applications themselves. Since the applications run or operate at client machines, a company may need to track and manage a multitude of client applications. Each client application, in turn, can itself be comprised of multiple versions which can be updated independently. A core problem, therefore, is managing different versions of applications, each of which can be updated independently.

A change to any one application has a rippling effect, as such a change must be propagated to each client dependent on that application. As a client application is executing, the system should ensure that that client obtains the latest version of the application (or of independently updated components). Other problems include (1) too many individual applications to keep track of—both for users and for IS administrators; (2) too difficult to keep track of what versions of each application exists; (3) very expensive to keep everyone's desktops up-to-date (incurring costs even if the user never access the program); and (4) too difficult to distribute apps to remote sites.

The classic approach to this problem—creating a monolithic "mega-application" that contains all possible features—is, in itself, problematic. For example, resource needs of these applications drive increasing hardware requirements and accelerate hardware turnover. Further, as new functionality is added to the application, the entire application must be reinstalled on all the clients, incurring re-installation costs.

At the same time in such an environment, however, the client-side application represents only a portion of the operating environment. For instance, business logic for such a system can be separated out from client applications and, instead, be implemented at the server side, thereby providing a central repository for business logic. To a certain extent, an HTTP server is a facilitator of such an approach, generally facilitating the interaction of a client-side web browses with backend data stored on a server.

Additionally, HTTP servers facilitate the integration of client-side web application with the Internet. For example, a user browsing web pages can, in a transparent manner, launch local applications which display Web-downloaded documents, by simply clicking on a link to the corresponding application. Although this approach provides a scheme for supporting widely-installed applications, the approach is not designed for nor particularly well suited to distributing applications within a company (or larger organization).

A newer approach to providing distributed application functionality is Microsoft's ActiveX technology (ActiveX SDK available at http//www.microsoft.com/msdownload/activex.htm; the disclosure of which is hereby incorporated by reference), which includes "ActiveX Controls" and "Active Document." An ActiveX Control in implemented as a rectangular control appearing within an Hypertext Markup Language (HTML) page, a well-known format. When the page is loaded into a browser, the browser automatically downloads the control and runs it. The approach has its disadvantages, however. First, the ActiveX Control must exist within a container—an HTML page—and, thus, must operate within the confines of that container. For instance, the control does not have access to the entire screen region for the page (as it must exist as a containee within the page). Further, since the ActiveX Control relies on an HTML page as the "downloader" container, the control can only be inserted into HTML pages; it cannot be deployed within other containers or standalone. Since it is forced to be a client of HTML page, an ActiveX Control has an inherent limit in its deployment.

Consider, for instance, an application constructed so that separate modules or components of the application are downloaded over a period of time, as an end-user envokes different functionality. Accordingly, greater flexibility is needed for the underlying framework of the application—flexibility which is not provided by the approach of employing an ActiveX Control embedded within an HTML page. All told, since an ActiveX component is designed to serve as a component, it does not provide and adequate framework for an entire application.

Another approach is to employ a control which serves as a stub for launching another application, one which executes within its own window. Since the approach does not provide seamless integration with the browser, it is undesirable. For instance, if the user selects the "back" button from the browser, what treatment, if any, should the separately executing window receive. Therefore the approach of launching a separate process sacrifices the seamless integration which users have become accustomed to when using web browsers. Both ActiveX Controls and Java applets suffer from this problem.

An ActiveX "Active Document" solves this user interface problem, yet itself creates other problems. Specifically, an active document does not include the ability to download program code. In particular, an active document (e.g., Microsoft Word Document) requires that a host application (e.g., Microsoft Word) be present locally on the users machine. Specifically, the HTML page includes a reference indicating thatthe document (data file) can be viewed by launching a session of the locally-stored hosting application.

From the perspective of attempting to solve the business problem of distributing applications with the latest version downloaded automatically, such an approach is unacceptable. Specifically, the program code (for the application) is stored locally at the users machine with no provision for downloading program code at the time of the programs execution. Although an active document allows one to have a downloadable "document" (logical representation of the uses data, such as the text in a word processing file), it does not provide a downloadable "view" (i.e., the code that creates the on-screen representation of that data).

The World Wide Web as it exists today is a distributed, interconnected set of documents that are available from anywhere. What is really needed is a system which provides a facility for achieving the same sort of distribution and interconnections between application objects. Such a system would provide a centralized repository for program code (e.g., stored on a server), with the ability to keep the code up to date, together with seamless integration into the Worldwide Web so that users can easily access distributed applications through Web page links. The present invention fulfills this and other needs.

SUMMARY OF THE INVENTION

A development system of the present invention provides a form-based development environment for partitioning an application such that it can be seamlessly integrated into corporate Webs. In particular, the system is used to implement a form as an "application page" and published as an ActiveX object. Once the form is built into an ActiveX object and digitally signed, it can be downloaded to a client and run in a Web browser, such as Microsoft Internet Explorer.

Of particular interest is a technique for associating a host application with a document is through a use of well-known MIME (Multipurpose Internet Mail Extension) types. MIME provides a standardized technique for packaging a document object. It includes a MIME header for indicating which application is appropriate for hosting the document, all contained in a format suitable for transmission across the Internet. In accordance with the present invention, a new "application" document or page type is defined: application/x-appdoc. This contains information necessary to create a document (e.g., Microsoft ActiveX Document) locally but, in addition, also includes information necessary to find and download the program code for rendering the view of the document. If the program code is already present locally, it need only be downloaded for purpose of updating the local copy.

The new MIME type is associated with a file extension of .APP. A file with the .APP extension is an OLE Document, implemented by an OLE DocObject. Because the APP file is a file, it can be placed on a server and linked to using an HTML HREF. The APP file contains the following pieces of data: (1) the CLSID (class ID) of an ActiveX object, which is an OLE Document Viewer implemented as a Delphi Form, (2) the URL of the codebase where the object's code can be found, (3) (optionally) a requested version number. Once the .APP DocObject handler code is installed and registers the APP MIME type, it can be used to download an .APP file into the user's Web browser.

On the server side, since the .APP file is really a file, the Web server simply receives the request and returns the file to the client. When the APP file is downloaded, the APP DocObject handler asks the operating system to download the codebase for the object specified in the .APP file. This system functionality is available in Windows through the CoGetClassObjectFromURL function. After the ActiveX object's codebase is downloaded, the .APP DocObject handler asks the browser to create a view on itself, for instance, by calling the ActivateMe method on the Explorer document site. The Internet Explorer then calls the DocObject back to instantiate a view, which it does by creating an instance of the ActiveX view object from the code that was downloaded. Once created, the ActiveX view object gets in-place activated in the Internet Explorer, which creates the Delphi form and all its child controls.

Once the form is created, it can establish connections back to any remote server objects it needs to perform its functions. At this point, the user can interact with the form, which will appear embedded in the Internet Explorer frame. When the user changes to a different page, the browser assume responsibility for eventually closing and destroying the form (and relinquishing any outstanding connections to the remote servers).

DETAILED DESCRIPTION OF A PREFERRED EMBODIMENT

The following description will focus on a preferred embodiment of the present invention (and certain alternatives) embodied in a visual development environment running on an Intel 80x86-compatible computer operating under an event-driven operating system, such as the Microsoft® Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

GENERAL ARCHITECTURE

A. System Hardware

Figure 1A:
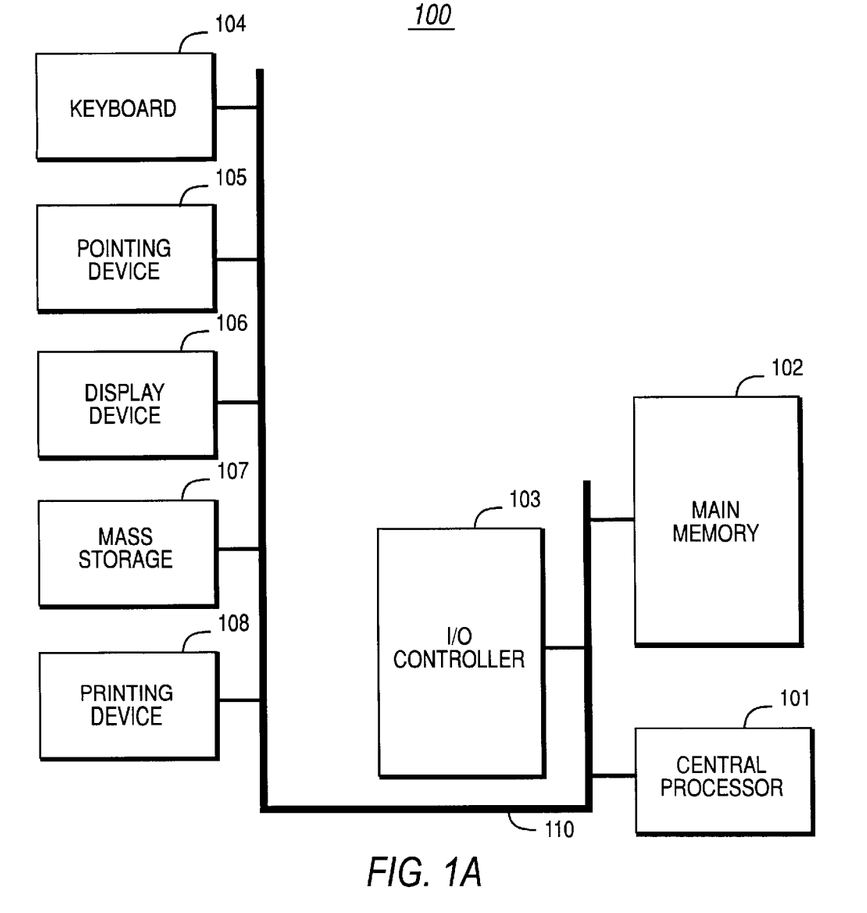
FIG. 1A is a block diagram of a computer system in which the present invention may be embodied.

The present invention may be embodied on a computer system such as the system 100 of Fig. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM), and the like). Additional input/output devices, such as a printing device 108, may be provided with the system 100 as desired.

As shown, the various components of the system 100 communicate through a system bus 110 or similar architecture. In a preferred embodiment, the system 100 includes an IBM-compatible personal computer, available from a variety of vendors (including IBM of Armonk, N.Y.).

B. System Software

Figure 1B:
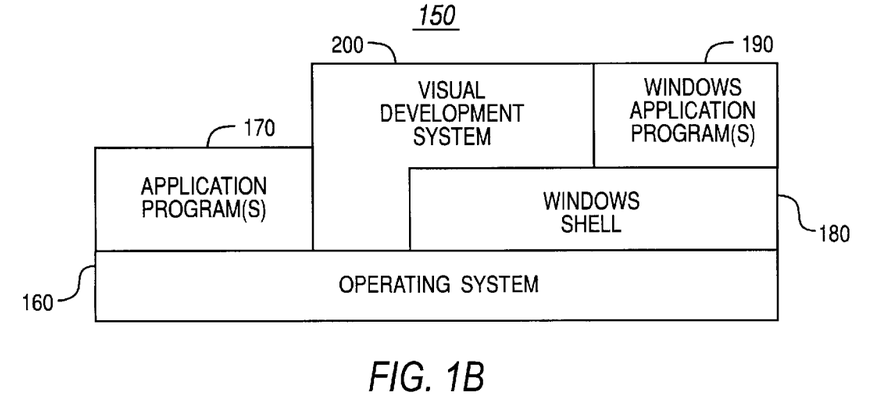
FIG. 1B is a block diagram of a software system provided for directing the operation of the computer system of Fig. 1A.

Illustrated in Fig. 1B, a computer software system 150 is provided for directing the operation of the computer system 100. Software system 150, which is stored in system memory 102 and/or on disk storage 107, includes a kernel or operating system (OS) 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a visual development system 200 of the present invention for developing system and application programs. As shown, the development system 200 includes components which interface with the system 100 through windows shell 180, as well as components which interface directly through OS 160.

In a preferred embodiment, operating system 160 and shell 180 are provided by Microsoft® Windows95/Windows NT. Those skilled in the art will appreciate that the system may be implemented in other platforms, including Macintosh, UNIX, and the like. Application software 170, 190 can be any one of a variety of software applications, such as word processing, database, spreadsheet, text editors, and the like, including those created by the development system 200, which is now described in greater detail.

C. Development System

Figure 2:
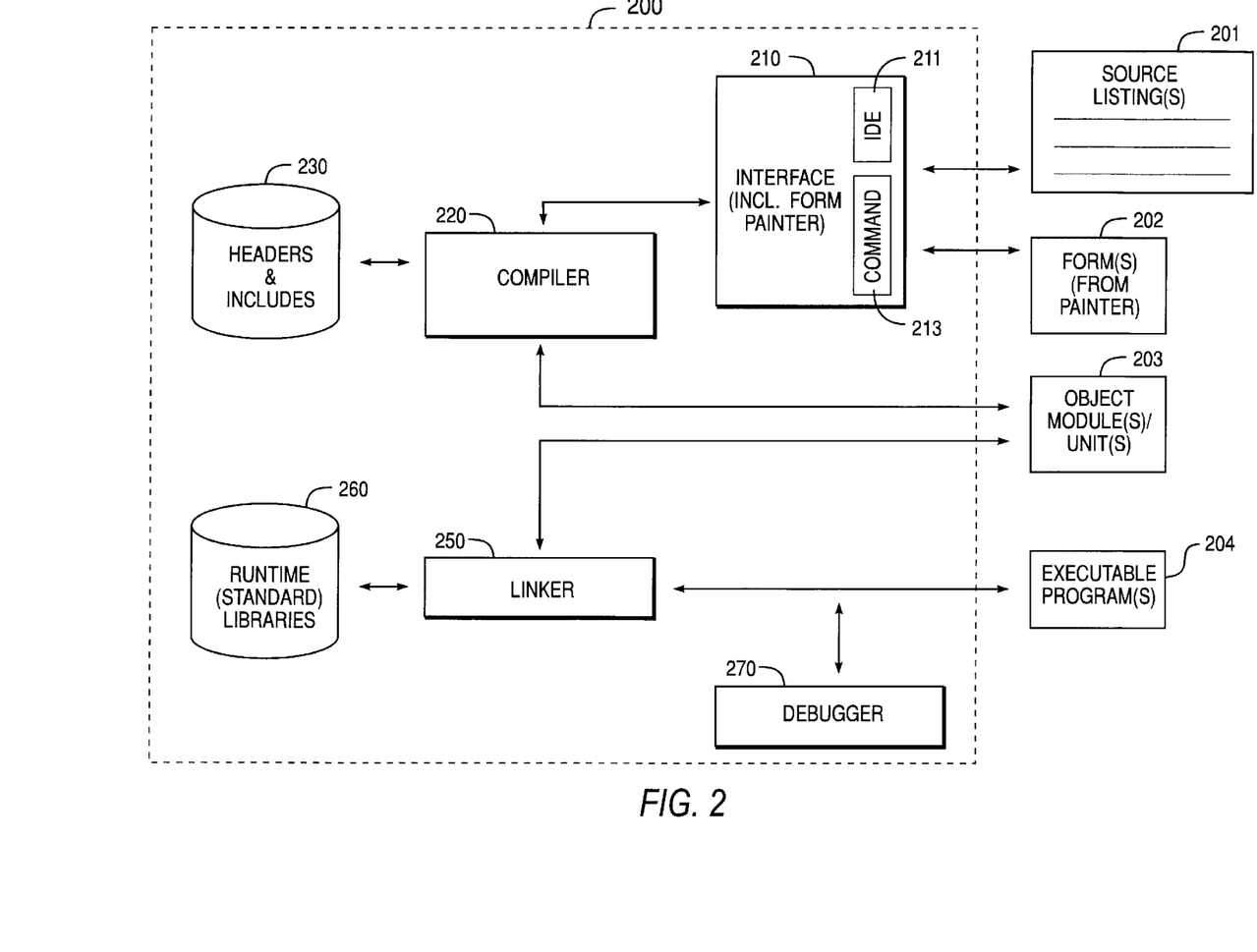
FIG. 2 is a block diagram of a visual development system of the present invention which includes a compiler, a linker, and an interface.

Shown in further detail in FIG. 2, the visual development system 200 of the present invention includes a compiler 220, a linker 250, and an interface 210. Through the interface, the developer user "paints" forms 202 with objects and supplies source listings 201 to the compiler 220. Interface 210 includes both command-line driven 213 and Integrated Development Environment (IDE) 211 interfaces, the former accepting user commands through command-line parameters, the latter providing menuing equivalents thereof. From the source code or listings 201, forms 202, and headers/includes files 230, the compiler 220 "compiles" or generates object module(s) or "units" 203. In turn, linker 250 "links" or combines the units 203 with runtime libraries 260 (e.g., standard runtime library functions) to generate program(s) 204, which may be executed by a target processor (e.g., processor 101 of FIG. 1A). The runtime libraries 260 include previously-compiled standard routines, such as graphics, I/O routines, startup code, math libraries and the like.

A description of the general operation of development system 200 is provided in the manuals accompanying Delphi™: *Users Guide* (Part No. HDA1320WW21772), and *Components Writer's Guide* (Part No. HDA1320WW21773). Further description can be found in *Object Pascal Language Guide* (Part No. HDA1320WW21774) and *Visual Component Library Reference* (Part No. HDA1320WW21775). The disclosures of each of the foregoing (which are available directly from Borland International of Scotts Valley, Calif.) are hereby incorporated by reference.

Operation (i.e., "compilation") by a compiler, such as compiler 220, is generally driven by its two main components: a front end and a back end. The "front end" of the compiler parses the source program and builds a parse tree—a well known tree data structure representing parsed source code. The "back end" traverses the tree and generates code (if necessary) for each node of the tree, in a post-order fashion. For an introduction to the general construction and operation of compilers, see Fischer et al., *Crafting a Compiler with C*, Benjamin/Cummings Publishing Company, Inc., 1991, the disclosure of which is hereby incorporated by reference. Further description of the back end of the compiler is provided in commonly-owned U.S. Pat. No. 5,481,708, issued Jan. 2, 1996. Description of a linker, such as Borland's TurboLinker, is provided in commonly-owned U.S. Pat. No. 5,408,665, issued Apr. 18, 1995. The disclosures of each of the foregoing patents are hereby incorporated by reference.

D. General Development Interface

Figure 3:
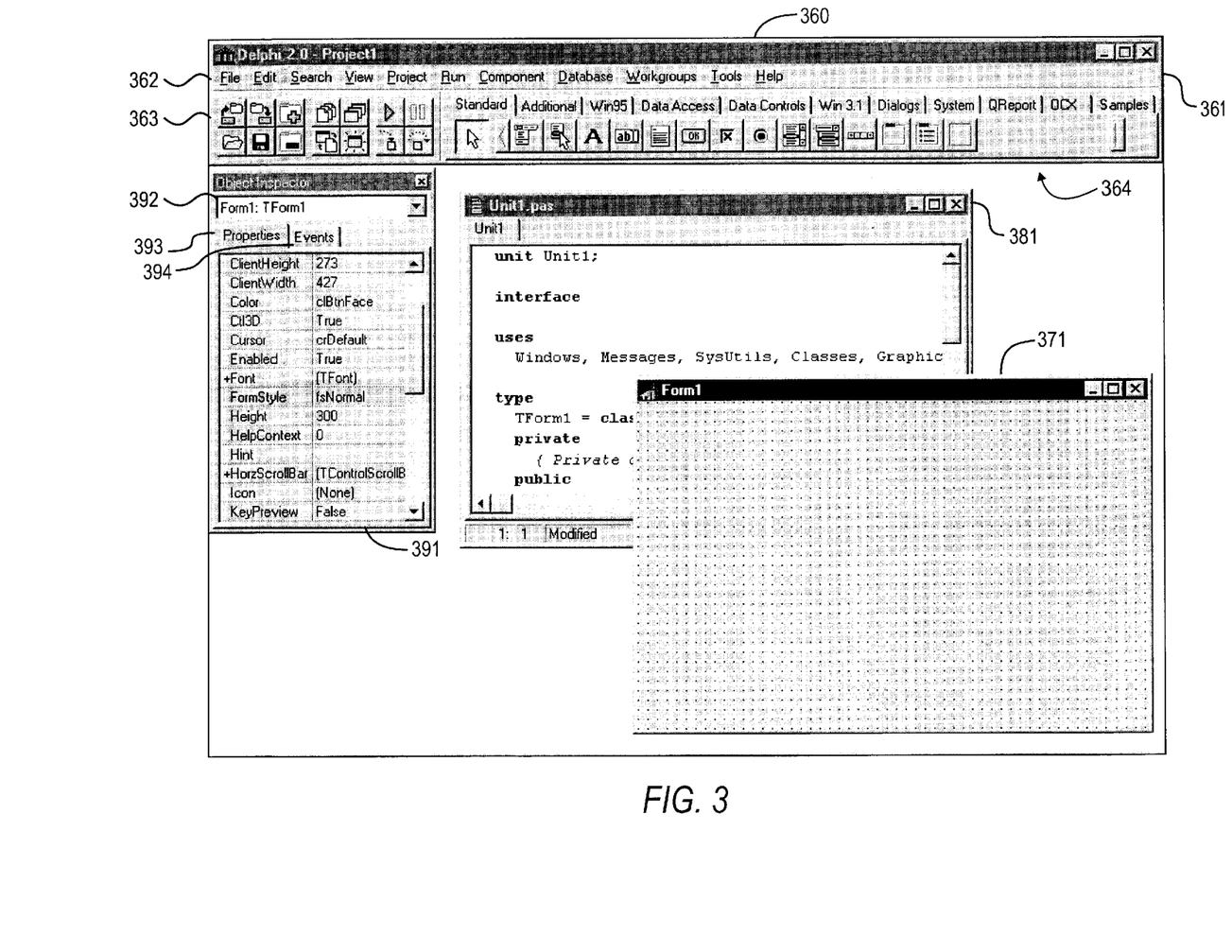
FIG. 3 is a bitmap screenshot illustrating a preferred interface of an application development environment in which the present invention is embodied.

The present invention is embodied in Delphi™, a component-based, rapid application development (RAD) environment available from Borland International of Scotts Valley, Calif. FIG. 3 illustrates an application development environment 360, which is provided by Delphi. Many of the traditional requirements of programming, particularly for Windows applications, are handled for the programmer automatically by Delphi.

As shown, the programming environment 360 comprises a main window 361, a form 371, a code editor window 381, and an object manager or "inspector" window 391.

The main window 361 itself comprises main menu 362, tool bar buttons 363, and component palette 364. Main menu 362 lists user-selectable commands, in a conventional manner. For instance, the main menu invokes File, Edit, View submenus, and the like. Each submenu lists particular choices which the user can select. Working in conjunction with the main menu, toolbar 363 provides the user with shortcuts to the most common commands from the main menu. The toolbar is configurable by the user for including icons for most of the menu commands.

Forms, such as form 371, are the focal point of nearly every application which one develops in the environment. In typical operation, the user employs the form like a canvas, placing and arranging "components" on it to design the parts of one's user interface. The components themselves are the basic building blocks of applications developed within the environment. Available components appear on the component palette 364, which is displayed as part of the main window 361. The form can be thought of as a component that contains other components. One form serves as the main form for the application; its components interact with other forms and their components to create the interface for an application under development. In this manner, the main form serves as the main interface for an application, while other forms typically serve as dialog boxes, data entry screens, and the like.

During "design" mode operation of the system, the user can change the properties of the form, including resizing the form and moving it anywhere on screen. The form itself includes standard features such as a control menu, minimize and maximize buttons, title bar, and resizeable borders. The user can change these features, as well as other "properties" of the form, by using the object inspector window 391 to edit the form during design time. Thus, properties define a component's appearance and behavior.

Components are the elements which a user employs to build his or her applications. They include all of the visible parts of an application, such as dialog boxes and buttons, as well as those which are not visible while the application is running (e.g., system timers). In the programming environment 360, components are grouped functionally on different pages of the component palette 364. Each functional group is identified by a tab member, which includes a label indicating the particular nature of the group. For example, components that represent the Microsoft Windows common dialog boxes are grouped on the "Dialogs" page of the palette. The palette can incorporate user-created custom controls, which the user installs onto the palette. Additionally, the user can install third-party components.

The object inspector window 391 enables the user to easily customize the way a component appears and behaves in the application under development. The inspector 391 comprises an object selector field 392, a properties page 393, and an events page 394. The object selector 392 shows the name and type of the currently selected object, such as "Form1," as shown. The properties page 391 lists the attributes of a component placed on a form (or the form itself) which can be customized. The events page, on the other hand, lists "event handlers" for a particular component. Event handlers are specialized procedures which may include user-provided program code.

Code editor 381 is a full-featured editor that provides access to all the code in a given application project. In addition to its basic editing functionality, the code editor 381 provides color syntax highlighting, for assisting the user with entering syntactically-correct code. When a project is first opened, the system automatically generates a page in the code editor for a default unit of source code; in the Object Pascal preferred embodiment, the default unit is named Unit1.

The following description will focus on methods of the present invention for creating Web-delivered application forms, using the above-described visual development environment. In particular, the system is used to implement a form as an "application page" and published as an ActiveX object. Once the form is built into an ActiveX object and digitally signed, it can be downloaded to a client and run in a Web browser, such as Microsoft Internet Explorer.

WEB-DELIVERED APPLICATIONS

A. Dividing Applications Into Frames

At the outset, it is helpful to view an application not so much as a collection of features or functionality but, instead, as a collection of discrete frames or views. A typical business application, for instance, generally includes a set of menu items, each of with invokes a particular frame—that is, a form which manifest certain functionality of the application. With this perspective, an application is viewed not as a monolithic body of code but as a collection of applets, or bundles of functionality. In this manner from within a browser, a user would select a Web page link which would, in turn, invoke a particular frame of the application (i.e., subapplication).

In addition to expressing an application as a collection of frames, an applications is also expressed as a location on the Internet, a URL (Universal Resource Locator) address pointing the application. Each URL includes two characteristics: content data for the URL (i.e., whatever data is stored on the server) together with a data type or MIME (Multipurpose Internet Mail Extension) type. The data type allows a Web browser to determine how it should interpret data received from a server (e.g., such as interpreting a .gif file as a bitmap image). In effect, this serves as a description of what to do with the data once it is received at the browser. If a stream of binary data is received as type HTML, the browser renders it as an HTML page. If instead it is received type bitmap, on the other hand, the browser renders it as a bitmap image.

B. New MIME Type

In Microsoft Windows, different techniques exist for allowing a host application to register an interest in a data object (i.e., data of a particular type). One technique is for the application to register with Windows an interest in a particular file extension for an (e.g., .doc—"Microsoft Word Document"); this is the most common technique employed by Window applications. An other approach, employed in Microsoft Object Linking and Embedded (OLE), is the use of a class Globally Unique Identifier or GUID—a 16-byte identifier for indicating a particular server application to invoke (for hosting the document having the GUID). The class ID is registered on a particular machine as being connected to a particular DLL (Dynamic Link Library) or application server.

Of particular interest is a technique for associating a host application with a document is through a use of MIME types. MIME provides a standardized technique for packaging a document object. It includes a MIME header for indicating which application is appropriate for hosting the document, all contained in a format suitable for transmission across the Internet. In accordance with the present invention, a new "application" page MIME type is defined: application/x-appdoc. This contains information necessary to create a document (e.g., Microsoft ActiveX Document) locally but, in addition, also includes information necessary to find and download the program code for rendering the view of the document. If the program code is already present locally, it need only be downloaded for purpose of updating the local copy. This defines a new document type which includes information supporting downloadable program code for rendering a view of the document.

The new MIME type is associated with a file extension of .APP. A file with the .APP extension is an OLE Document, implemented by an OLE DocObject. Because the .APP file is a file, it can be placed on a server and linked to using an HTML HREF. The .APP file contains the following pieces of data: (1) the CLSID of an ActiveX object, which is an OLE Document Viewer implemented as a Delphi Form, (2) the URL of the codebase where the object's code can be found, and (3) (optionally) a requested version number. Once the .APP DocObject handler code is installed and registers the APP MIME type, it can be used to download an .APP file into the user's Web browser.

On the server side, since the .APP file is really a file, the Web server simply receives the request and returns the file to the client. When the APP file is downloaded, the .APP DocObject handler asks the operating system to download the codebase for the object specified in the .APP file. This system functionality is available in Windows through the CoGetClassObjectFromURL function. After the ActiveX object's codebase is downloaded, the .APP DocObject handler asks the browser to create a view on itself, for instance, by calling the ActivateMe method on the Explorer document site. The Internet Explorer then calls the DocObject back to instantiate a view, which it does by creating an instance of the ActiveX view object from the code that was downloaded.

Once created, the ActiveX view object gets in-place activated in the Internet Explorer, which creates the Delphi form and all its child controls.

Once the form is created, it can establish connections back to any remote server objects it needs to perform its functions. At this point, the user can interact with the form, which will appear embedded in the Internet Explorer frame. When the user changes to a different page, the browser assume responsibility for eventually closing and destroying the form (and relinquishing any outstanding connections to the remote servers).

C. End-user Operation

FIGS. 4A–D illustrate a web-delivered application, from the perspective of an enduser. From an end-user's desktop, the entry point to the system is the corporate home page 400, such as the one shown in FIG. 4A. The figure illustrates a Web-browser 400 (e.g., Microsoft Internet Explorer) displaying a Web page 401, such as the home page for a particular company. The page 401 includes, in a conventional manner, a number of links, such as link 403. In response to the user clicking on a particular link to an application page, the web browser connects to the application page (file) residing on the server.

Figure 4A:
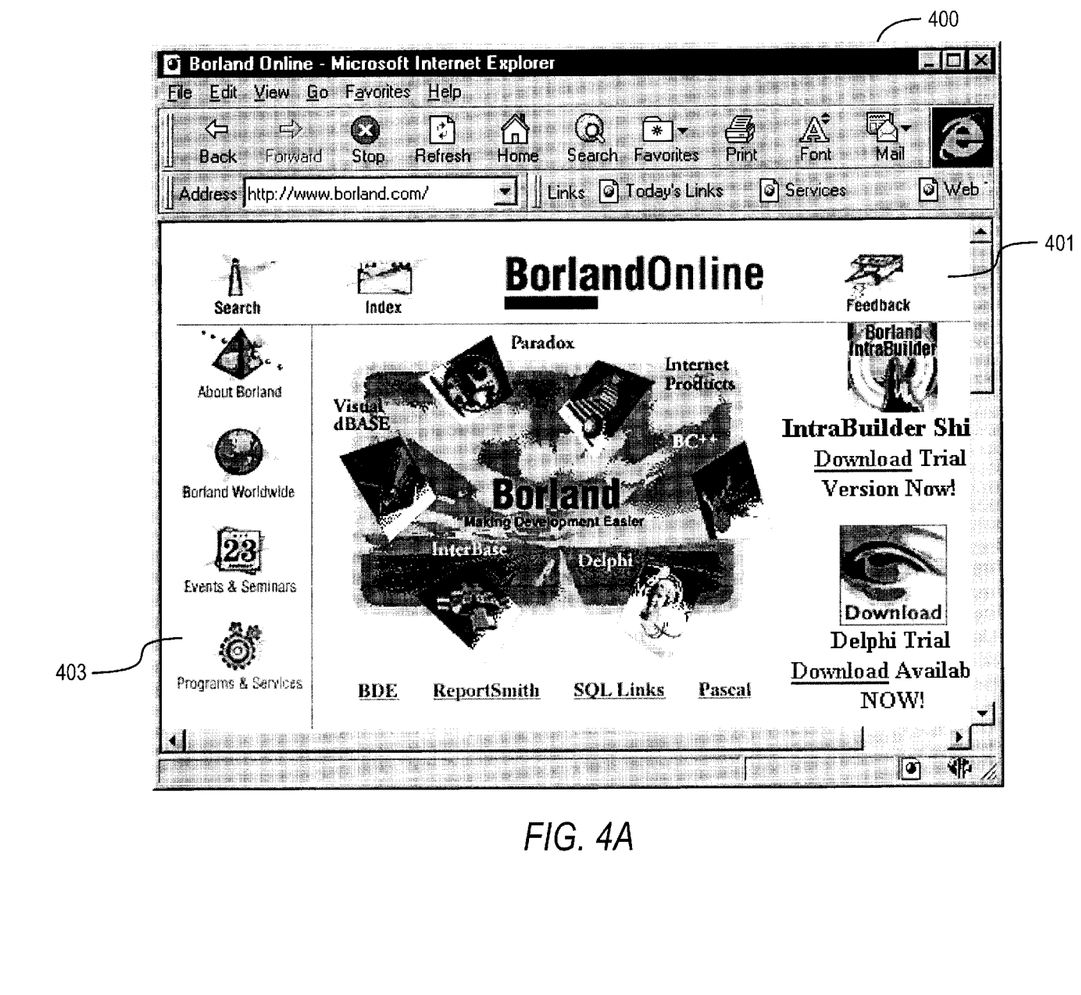
FIGS. 4A–D are bitmap screenshots illustrating user operation of a Web browser for executing a Web-delivered application document.
Figure 4B:
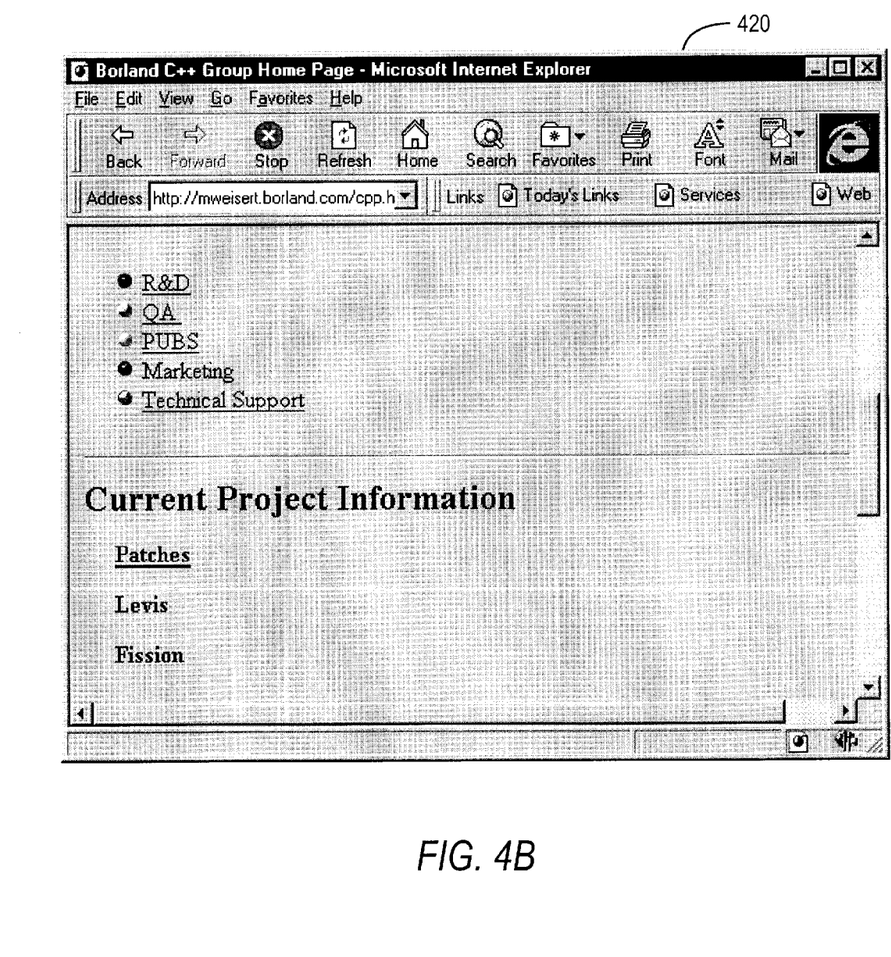

Clicking on a link can bring the user to a departmental homepage 420, shown in FIG. 4B. The departmental home page include links pointing to HTML documents that contain policies, status, procedures, reports, and other documents. Some pages contain HTML forms that are intended to send data to a server-based application, some contain dynamically-created HTML documents.

Figure 4C:
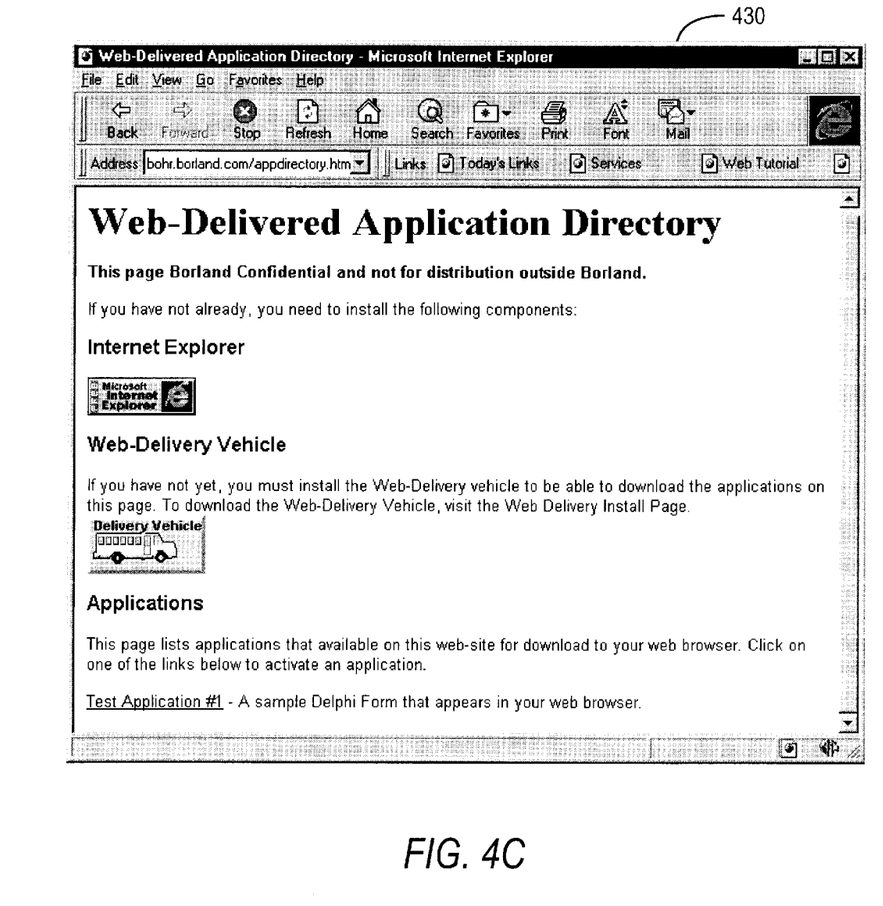

In addition to these existing features of an Intranet, the new page type—an application (appdoc) page—is provided for in-place execution of an application in the Web browser. Since each application page is located using an URL, other pages can have hyperlinks to it. Multiple application pages can be grouped together by making a catalog page that contains hyperlinks to the application pages. When the user selects a hyperlink that points to to an application page, the Web browser downloads the application code and executes the page inside the browser, as FIG. 4C illustrates.

Upon the browser downloading the application page, the browser (based on the defined MIME type) invokes a local handler, a handler for documents of a type. More particularly, the application page includes a Globally Unique Identifier (GUID) and a codebase URL for identifying a remote (downloadable) application to invoke for hosting the document. Given the document object and the GUID which arrive with the application page, the local handler looks to the client machine to see if the hosting application already resides locally (e.g., by examining Windows 95/NT registry). At this point the local handler can choose to invoke a local copy (if any) or download the latest version of the host application.

Different models of downloading code are commonly available. When code is downloaded, a "code base" specification (file) is initially requested from the server. The code base itself can range from a simple DLL file to a Cabinet file (Microsoft .cab file) containing multiple compressed files. Still further, an information (e.g., Microsoft .inf) file can be employed for instructing the client system how to install the downloaded application. These mechanisms afford great flexibility in choosing which component of an application gets downloaded and when.

For the currently-referred embodiment, the machinery employed for actually downloading program code itself relies on standard Microsoft ActiveX API (Application Programming Interface)-calls Although the ActiveX API does not provide native support for Web-delivered applications, its API can be invoked for locating the correct version of the program code, copying it to the local machine, verifying its integrity, and registering it with the clients operating system. Once the code has been downloaded, the handler can proceed to invoke the now-present application host for rendering the document object (in a manner similar to invoking the hosting application through the registry if it were already installed).

Figure 4D:
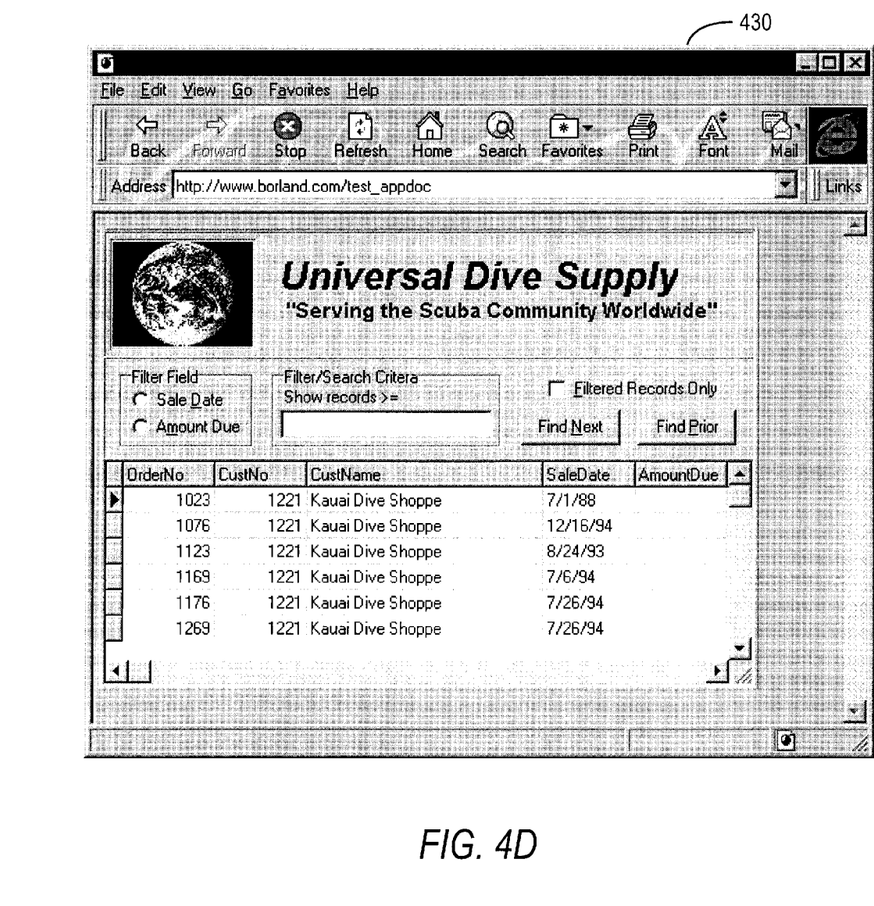

Now that the hosting application (OLE server) is loaded at the client, the client system can employ the OLE document view architecture to render the application correctly within the browser, including using conventional OLE methodology for adding the application's menu to that of the browser and for correctly re-sizing the application upon a re-size of the browser (as oppose to requiring the application to execute within a single Active X control rectangle—the limitation previously noted). Once the application is executing at the client, such as illustrated in FIG. 4D, it can execute remote logic such as using RPC (Remote Procedure Call) methodology. In this manner business logic which is preferably implemented as remote procedure's can still be used, as before.

D. Summary of System Architecture

Figure 5:
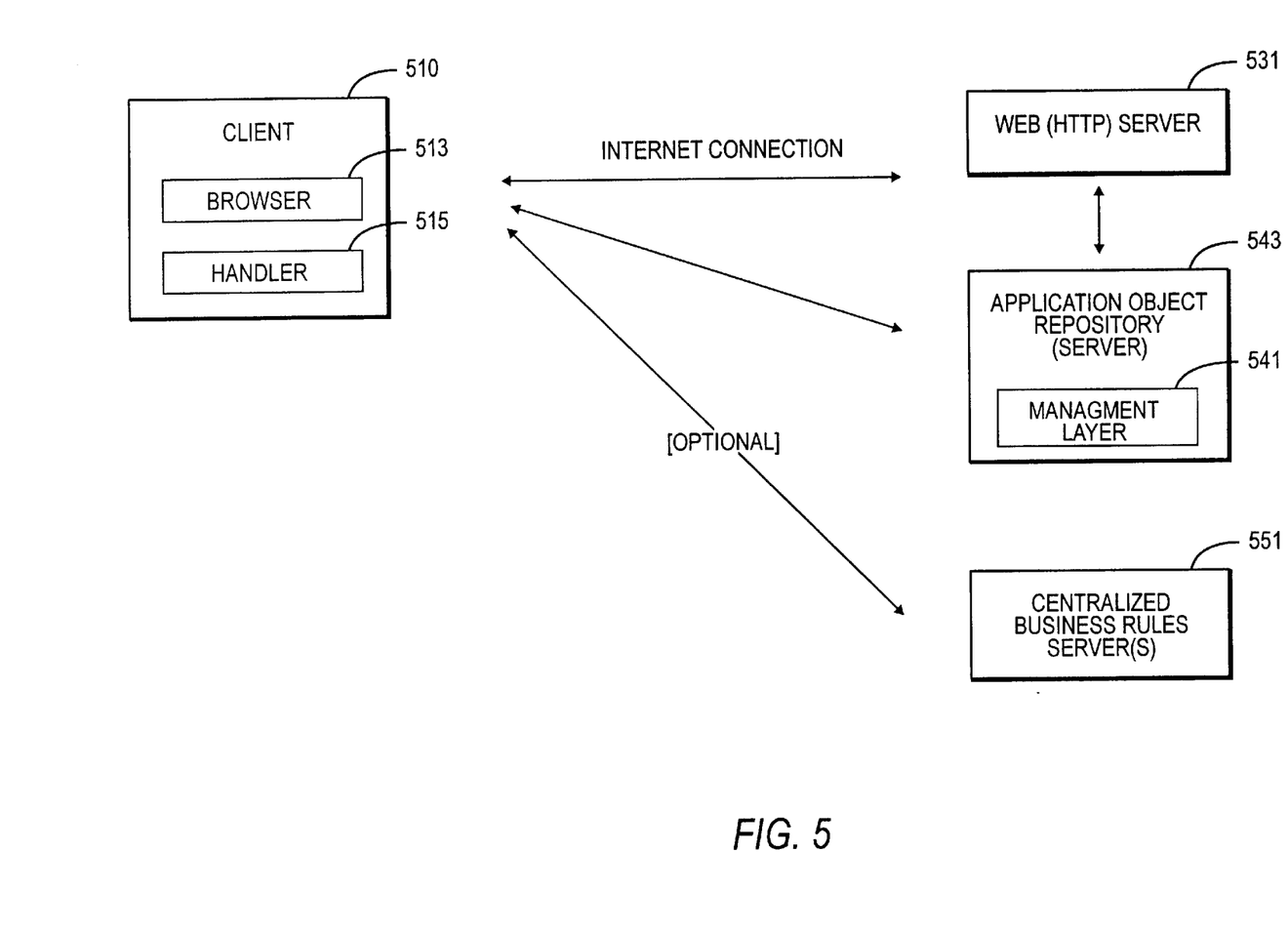
FIG. 5 is a block diagram summarizing overall system architecture.

FIG. 5 is a block diagram summarizing system architecture 500. On the client side 510, the system includes at least on client 511 operating a web browser 513, in conjunction with application handler 515. The client 511 communicates via Internet connection 520 with a web for an HTTP server 531. Based on request received from clients, the HTTP server delivers to authorized clients application pages which, in turn, are maintained by application object repository (server) 543. The repository server 543 itself operates under the control of management layer 541 which, for instance, provides versioning control over various application objects. The management layer 541 preferable includes a user interface providing administrator functionality. Here, the system administrator can grant and modify user right and install new application objects in the repository. To facilitate response time, the actual application objects themselves are preferable small as so as to minimize download time. Optionally, an application, once executing at the client, can establish remote procedure calls to remote servers 551, for executing centralized business logic or rules. In addition to conventional security techniques (e.g., code signing), the Web-page approach provides an additional security measure, the ability to identify request for pages on a per-client basis. Accordingly, clients can be provided with different access privileges, there by limiting which code modules can be downloaded by which particular clients.

E. Internal Operation

1. Overview

The general process of downloading an ActiveDocument-enabled Form object (i.e., ActiveDocForm) from an HTTP-server codebase to a client machine involves a communication session between the client browser and an HTTP server. During the downloading process, several objects are created in order to facilitate the downloading and to conform to the ActiveDocument protocols for activation and UI layout. For example, the client machine includes an ActiveDoc-compliant object which is installed to initiate the downloading of the code. This object is installed as a separate component (apart from the components of the process described here).

The process employed extends the standard process of instantiating an ActiveDoc object. Preferably, other aspects of the process are not changed in order to ensure compatibility with existing ActiveDoc-enabled browsers. The following description will, therefore, focus on those modificiations to the ActiveDoc process for allowing downloading of the code and maintenance of the code on an HTTP server.

2. Starting a Download

The process begins when a user selects a downloadable ActiveDocument; this occurs in the same manner that the user typically selects an HTML page. The user may type a URL address into the browser or click on a hyperlink. The browser then makes a request to the HTTP server for the specified file, using the HTTP GET command.

3. Returning the File from the Server

In response to receiving the request, the HTTP server returns the requested file in binary form, including a header that contains information about the file. Of particular interest in the header is the file's MIME type. The system-defined MIME type of "application/x-appdoc" establishes that the file is an ActiveDocForm. By convention, ActiveDocForms have an extension of ".APP" (but this is not required).

4. Displaying the File's Contents

When the browser receives the binary file from the server, it needs to determine how to display the file. As previously described, the operating system maintains a registry of information that, among other things, indicates whether an ActiveDoc server is to be used to display a particular MIME type. Upon receiving a file with a header, the browser looks up the MIME type in the system registry to determine which ActiveDoc object will handle the display of the object.

Displaying an ActiveDoc-compliant data file on screen is itself a two-step process (defined by the ActiveDoc specification). ActiveDoc specifies there will be two objects that cooperate with each other: a "Document" object and a "View" object. First, an in-memory Document object is created and filled with the data from the file. Then, the Document object is told to create a View object; this View object will be attached to a user-interface frame (in this case, the web browser). As required by ActiveDoc protocol, the Document and View objects, while distinct objects, must be defined in the same DLL module and must both be installed on the machine before attempting to display the file. The first restriction stems from a limitation of the ActiveDoc specification: there is simply no way for the two objects to communicate the necessary information without having been created from the same module. The second restriction exists because the ActiveDoc specification does not specify any standard for code download; nor does the browser support this.

In the case of an ActiveDocForm file, the browser looks up the "application/x-appdoc" MIME type in the registry, and determines an ActiveDocForm Document object (if any) to handle the file type. Recall that the ActiveDocForm Document object is the object installed on the machine before beginning the download process. The browser proceeds to create an instance of the ActiveDocForm Document handler object and fills it from the APP file. The browser then asks the Document object to create a View object.

5. Downloading the Code

At this point, the ActiveDoc process is modified substantially. The .APP file contains the following information: (1) a class ID; (2) a codebase URL; and (3) a required version number. This information enables the ActiveDocForm Document handler to download the code needed to create the View portion of the Document-View pair.

The Document handler loads this information from the .APP file that it receives from the HTTP server. The following code demonstrates an exemplary method for performing this.

```
procedure TAppDocument·LoadFromStream(Stream: TStream);
// The TStream parameter should be a TOleStream object that converts
// an OLE Istream to a Delphi-standard TStream, for convenience.
var
  AppDocData: TAppDocData;
  Len: Longint;
  p: PWideChar;
begin
  Stream.Read( AppDocData,SizeOf(AppDocData));
  FCLSID :=AppDocData.CLSID;
  FClsContext : =AppDocData·ClsContext;
  FVersionMajor :=AppDocData.VersionMajor;
  FVersionMinor : =AppDocData·VersionMinor;
  // after the AppDocData, stores a Length DWORD, and
  // then a WideChar. Length is the number of characters
  // in the string, plus the terminating zero.
  Stream·Read( Len, SizeOf(Longint));
  p :=SysAllocStringLen( nil, Len-1 );
  Stream·Read( p ^ , Len*SizeOf(WideChar));
  FCodeBase :=p;
  SysFreeString(p);
end;
```

The Document handler first checks if the requested object is currently installed on the client machine, by checking if there is an object handler for the specified class ID and version number. If the object is installed, the Document handler goes directly to the next step, "Creating the View".

If the specified class ID is not present on this machine, or if it is not the correct version, the Document handler needs to download and install the specified codebase. This is accomplished using the ActiveX "Code Download" specification (API), such as CoGetClassObjectFromURL. The following three method definitions illustrate implementation of the process.

```
// This method implements the IOleDocument::CreateView method, which is part of the normal
// ActiveDoc protocol. This code method is generic, and calls the DoCreateView to
// implement the specifics of the ActiveDocForm downloadinhg code.
// After the view is created, the Document object connects itself to the View object via
// the View object's SetDocument method. This method is not part of the standard
// IOleDocumentView but instead is defined in the extended interface, IOleDocumentViewB.
function TActiveDocFormDocument·CreateView (Site: IOleInPlaceSite; Stream:
```

```
IStream; rsrvd: DWORD;
out View: IOleDocumentView) :HResult; stdcall;
var
ViewObj: IOleDocumentview;
hwndparent: HWND;
begin
Site._AddRef;
Site.GetWindow( hwndParent );
Assert(hwndParent <> 0);
ViewObj := nil;
try
DoCreateView(Site,ViewObj);
// The rest of this code establishes the View object that was created
as a
// view in the in-place container (i.e. the browser).
Site.GetWindow( hwndParent );
Assert(hwndParent <> 0);
if ViewObj = nil then
raise Exception.Create('Must create View object in DoCreateView');
FView := ViewObj as IOleDocumentViewB;
FView.SetDocument( Self as IOleDocument );
Site._Release;
if Site <> nil then
OleCheck( ViewObj.SetlnPlaceSite( Site ) );
if Stream <> nil then
OleCheck(ViewObj.ApplyViewState ( Stream ));
View := ViewObj;
Result := S_OK;
except
Result := HandleException;
end;
end;
// This method retrieves information about the browser's frame site object
// and then creates an instance of the object using
// CreateOleObjectWithCodebase
//
procedure TActiveDocFormDocument.DoCreateView ( Site: IOleInPlaceSite; out
View: IOleDocumentView);
var
   FrameWnd: HWND;
   ctr: IOleContainer;
   ct: IOleCommandTarget;
   sp: IServiceProvider;
   hwndParent: HWND;
   rcPosRect, rcClipRect: TRect;
   pActiveObject: IOleInPlaceActiveObject;
   DocWindow: IOleInPlaceUIWindow;
   InPlaceFrame: IOleInPlaceFrame;
   FrameInfo: TOLEINPLACEFRAMEINFO;
begin
OleCheck(Site.GetWindow( FrameWnd ));
OleCheck(Site.GetWindowContext ( InPlaceFrame,
        DocWindow,
        rcPosRect, rcClipRect, FrameInfo));
ct := nil;
InPlaceFrame.QueryInterface(IOleCommandTarget, ct);
OleCheck ( CreateOleObjectWithCodebase(
   FCLSID, FCodeBase, FVersionMajor, FVersionMinor,
   FClsContext,
   IOleDocurnentView,
   Framewnd,
   ct,
   View) );
end;
// This method creates an OLE server that it obtains by downloading
// its code from a codebase stored on an HTTP server. If the code
// is already installed (and has the correct version), the codebase
// isn't downloaded, but the object is just created from the local code.
// The code follows the ActiveX CodeDownload specification
// for downloading code from the HTTP server.
function CreateOleObjectWithCodebase(
   const CLSID: TGUID;
   const CODEBASE: String;
   VerMajor, VerMinor: Longint;
   clsContext: Longint;
   const iid: TGUID;
   OwnerWnd: HWND;
   const CmdTarget: IOleCommandTarget;      // receiver of
OLECMDID_SETPROGRESS
   out Obj ): HResult;
```

```
var
   CDH: TCodeDownloadHandler;
   BSC: IBindStatusCallback;
   BindCtx: IBindCtx;
   Factory: IClassFactory;
   hRes: HResult;
begin
   // create a handler for the bind context of the download process.
   // The CodeDownloadHandler is an object that implements IBindContext and
   // allows a progress bar to be displayed in the browser.
   CDH := TCodeDownloadHandler.Create( OwnerWnd, CmdTarget );
   BSC := CDH;
try
   OleCheck( CreateAsyncBindCtx( 0, BSC, nil, BindCtx ) );
   // Initiate the download of the object from the codebase, and retrieve
its
   // factory object. This returns S_OK if the object is already installed
(and
   // has the correct version), or MK_S_ASYNCHRONOUS if the code is being
downloaded.
   hRes := CoGetClassObjectFromURL(
      CLSID,PWideChar(WideString(CODEBASE)),VerMajor,VerMinor,nil,
      BindCtx,clsContext,nil,IClassFactory,Factory);
   if hRes = MK_S_ASYNCHRONOUS then
begin
   // show progress dialog and wait until the download is done
   CDH.ShowDownloadProgress;
   hRes := CDH.FRes;
   // when download is done, if it succeeded then we need to get the
class
   // factory object.
   if SUCCEEDED(hRes) then
      Factory := CDH.OleObject as IClassFactory;
end;
   OleCheck(hRes);      // Check for any errors in the download.
      // Throws exception if there are errors.
   // Now that we have the class factory for the object, create an
instance of it.
   hRes := Factory.CreateInstance(nil,iid,Obj);
except
   hRes := HandleException;      // turn any exceptions into an error
code to return.
end;
Result := hRes;
end;
```

6. Extended Doc/View Interfaces

The Document and View objects of an ActiveDoc server communicate with each other via a two interfaces: IOleDocument and IOleDocumentView. These standard interfaces are not sufficient to allow the documents to be instantiated completely independently, since the document object is expected to know certain information about the views, and vice versa. Extension of the existing interfaces allows the Document and View objects to be created independently, without breaking compatibility with existing ActiveDoc containers. ActiveDocForm-compliant Document and View objects can implement the methods specified by these interfaces, in addition to the methods defined for the respective IOleDocument and IOleDocumentView interfaces.

```
IOleDocumentB = interface (IOleDocument)
   ['{AE5D13CA-15B5-11D0-8875-0020AFC621C3}']
   // The view may be required to provide a document title string for the
document, but
   // only the document knows its title (e.g. filename). This method
allows the view
   // to ask the document for its title.
   function GetTitle( out docTitle: PWideChar ): HResult;
end;
IOleDocumentViewB = interface (JOleDocumentView)
   ['{AE5D13C9-15B5-11D0-8875-0020AFC621C3}']
   // The document that creates this view wiil need to tell the view what
document it
   // is attached to, so that the view can fulfill the GetDocument method.
   function SetDocument( const docObj: IOleDocument ): HResult;
   // The document object may be asked to set or get the extent of the
current view, via
   // the document object's IOleObject::Set/GetExtent methods.
   function SetExtent( dwDrawAspect: Longint; const size: TPoint ):
HResult;
   function GetExtent( out size: TPoint ): HResult;
end;
```

7. Implementing a View Object

An ActiveDocForm-compliant View object is an OLE object that provides a window and implements IOleDocumentViewB as well as the other ActiveDoc view behaviors. The View object, originally conceived as a Delphi Form (although it could also be implemented using VB, MFC, OWL or direct Windows APIs), is an adapter object, TAppDocView. This object allows a standard Delphi Form to be created as an OLE object, implementing IOleDocumentViewB. TAppDocView is derived from TActiveDocumentView, which implements a standard ActiveDoc View object using a Delphi form class object.

TActiveDocumentView implements IOleInPlaceObject, IOleInPlaceActiveObject, IOleDocumentView, IObjectWithSite, IPrint and IOleCommandTarget, as specified by the ActiveDoc specification. It also implements IOleDocumentViewB, which allows the object to be built into a separate module from its document object. These base classes are provided in a class framework designed to ease construction of ActiveDocForm applications. The use of the framework allows a programmer to transform a normal Delphi form into an ActiveDocForm-compliant View object through the addition of just a few lines of code. The following program code defines a simple form object. The underlined code portions of the program code which identifies the object as an ActiveDocForm View.

```
// A unit that defines a standard Delphi Form with
   one edit field, two labels, three buttons and a
// panel component.
   The last few lines specify that this form should be registered
   as an ActiveDocForm
// object.
unit TestForm;
interface
uses
Windows, Messages, SysUtils, Classes,
Graphics, Controls, Forms, Dialogs,
StdCtrls, ExtCtrls, DocView, ComServ;
type
TForml = class(TForm)
Editl: TEdit;
Labell: TLabel;
Label2: TLabel;
Buttonl: TButton;
Button2: TButton;
Button3: TButton;
Panell: TPanel;
private
{Private declarations }
public
{Public declarations }
end;
var
Forml: TForml;
implementation
{$R *.DFM}
const
CLSID TestFormObj: TGUID =
'{AE5D13C8-15B5-11-DO-8875-0020AFC621C3}';
initialization
TAppDocViewFactor·Create(ComServer, TForml, CLSID_TestFormObj);
end.
```

8. Creating APP Files

The application object (.APP) files that are installed on the server are simply files that contain the information necessary for the ActiveDocForm Document handler to be able to locate the code that implements the view, regardless of whether the code is installed locally. In the current embodiment, this file has a binary format consisting of the following data record, followed by a string length (32-bits) and a Unicode-encoded codebase URL specifier.

```
TAppDocData = record
    cbSize: Integer;
    CLSID: TGUID;
    ClsContext: Longint;
    VersionMajor: Longint;
    VersionMinor: Longint;
end;
// Length: Longint
// CodeBaseUrl: array [O.. xxx ] of WideChar;
```

This file can be created in a conventional manner, with any tool capable of writing data files. In the current embodiment, the system provides a tool for creating these files by allowing the user to enter the data into a dialog box.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a Web-based computer system having a client connected to a Web server, the client including a Web browser, a method for Web-based delivery of executable applications, the method comprising:

creating at the server an application document, said application document including information necessary for locating and downloading program code necessary for rendering a view of the application document within the Web browser, without requiring that an application document handler already be installed at the Web browser;

installing at the client an application document handler, said handler capable of interpreting said information of said application document;

displaying in the Web browser a Web page having a hyperlink reference to said application document;

in response to user selection of the hyperlink reference, transmitting said application document from the server to the client;

in response to said transmitting of said application document from the server to the client, invoking said handler for processing said application document, including performing substeps of:

(i) determining whether program code capable of rendering the application document resides locally at the client;

(ii) if the program code does not reside locally, automatically downloading the program code from a location indicated by said information of application document, in a manner that does not require user intervention; and (iii) rendering the application document within the Web browser by executing said program code.

2. The method of claim 1, wherein said program code functions as a Microsoft OLE (Object Linking and Embedding) Server for the application document.

3. The method of claim 2, wherein said OLE Server registers its own menus with the Web browser.

4. The method of claim 1, wherein said application document comprises user data together with information indicating appropriate program code for hosting the user data.

5. The method of claim 1, wherein said information indicating appropriate program code for hosting the user data includes a Globally Unique Identifier (GUID) for locating the program code.

6. The method of claim 1, wherein said creating at the server step includes:

defining a new MIME (Multipurpose Internet Mail Extension) data type to comprise an "application page."

7. The method of claim 6, wherein said handler is invoked for processing objects of type "application page."

8. The method of claim 1, wherein said step of determining whether program code capable of rendering the application document resides locally at the client includes:

examining any available operating system registry for locating any program code located locally at the client which is capable of rendering a view of the application document.

9. The method of claim 1, wherein said server comprises an HTTP (Hypertext Transport Protocol) server which responds to HTTP requests from the client.

10. The method of claim 1, wherein before said step of transmitting said application document from the server to the client, further comprises:

validating whether the client has sufficient access rights for obtaining a copy of the application document.

\* \* \* \* \*